United States Patent
Lauer et al.

(10) Patent No.: US 11,440,220 B2
(45) Date of Patent: Sep. 13, 2022

(54) REPLACEMENT OF ROTATABLE CUTTING DISCS OF A POWER TOOL

(71) Applicant: Black & Decker, Inc., New Britain, CT (US)

(72) Inventors: Arthur Lauer, Idstein (DE); Robin Maerte, Idstein (DE); Isabell Oeffner, Idstein (DE); Fabian Riedl, Idstein (DE); Benjamin Schmidt, Idstein (DE); Stefan Sell, Idstein (DE)

(73) Assignee: Black & Decker, Inc., New Britain, CT (US)

( * ) Notice: Subject to any disclaimer, the term of this patent is extended or adjusted under 35 U.S.C. 154(b) by 0 days.

(21) Appl. No.: 16/690,986

(22) Filed: Nov. 21, 2019

(65) Prior Publication Data

US 2020/0164449 A1 May 28, 2020

(30) Foreign Application Priority Data

Nov. 28, 2018 (EP) ..................... 18208929

(51) Int. Cl.
*B28D 7/02* (2006.01)
*B23Q 11/00* (2006.01)
(Continued)

(52) U.S. Cl.
CPC .............. *B28D 7/02* (2013.01); *B23D 45/16* (2013.01); *B23Q 11/0046* (2013.01); *B23Q 11/0071* (2013.01); *B23D 59/006* (2013.01)

(58) Field of Classification Search
CPC ........ B28D 7/02; B23D 45/16; B23D 59/006; B23D 59/00; B23Q 11/0046; B23Q 11/0071; B23Q 11/00
(Continued)

(56) References Cited

U.S. PATENT DOCUMENTS 1,880,885 A  10/1932 Dittmar
2,789,404 A  4/1957 Robert et al.
(Continued)

FOREIGN PATENT DOCUMENTS

DE  3500371 A1  7/1986
DE  102015008579 A1  12/2016
(Continued)

OTHER PUBLICATIONS

Extended European Search Report, dated Jun. 18, 2019, for corresponding application No. 18208929.2-1019.
(Continued)

*Primary Examiner* — Nhat Chieu Q Do
(74) *Attorney, Agent, or Firm* — Rhonda Barton

(57) ABSTRACT

A power tool includes a rotatable support arrangement for supporting at least one cutting disc. An upper shroud member and a lower shroud member cooperate to define a volume in which the at least one cutting disc can be supported. The rotatable support arrangement can be coupled to the upper shroud member such that movement of the upper shroud member towards the lower shroud member causes the cutting disc to protrude through an opening in the lower shroud member. A biasing member urges the upper shroud member and the lower shroud member away from each other. A limiting mechanism limits the range of movement of the upper shroud member relative to the lower shroud member under action of the biasing member. The limiting mechanism can be disengaged by opening the upper shroud member via at least one hinge coupling.

16 Claims, 3 Drawing Sheets

(51) Int. Cl.
*B23D 45/16* (2006.01)
*B23D 59/00* (2006.01)

(58) Field of Classification Search
USPC .................................................. 30/376, 390
See application file for complete search history.

(56) References Cited

U.S. PATENT DOCUMENTS

| | | | |
|---|---|---|---|
| 2,801,654 A | | 8/1957 | Utz |
| 3,034,493 A | * | 5/1962 | Bandy ...................... B28D 7/02 |
| | | | 125/13.01 |
| 4,022,182 A | | 5/1977 | Lenkevich |
| 4,163,404 A | | 8/1979 | Lavis |
| 4,192,104 A | | 3/1980 | Patenaude |
| 4,905,424 A | | 3/1990 | Nagashima et al. |
| 5,033,192 A | | 7/1991 | Franz et al. |
| 5,146,682 A | | 9/1992 | Blochle et al. |
| 5,167,215 A | | 12/1992 | Harding |
| 5,531,147 A | | 7/1996 | Serban |
| 5,675,895 A | | 10/1997 | Mori et al. |
| 5,758,425 A | * | 6/1998 | Gallagher ................ B27B 9/02 |
| | | | 30/376 |
| 6,108,912 A | * | 8/2000 | Radigan ............... B23D 59/006 |
| | | | 30/124 |
| 7,223,163 B2 | | 5/2007 | Neumeier et al. |
| 7,300,339 B2 | | 11/2007 | Gaul et al. |
| 7,380,343 B2 | | 6/2008 | Yoshimura et al. |
| 7,526,866 B2 | | 5/2009 | Schnell et al. |
| 7,562,456 B2 | | 7/2009 | Roehm et al. |
| 7,578,063 B2 | | 8/2009 | Martin |
| 7,628,102 B2 | | 12/2009 | Kamiya et al. |
| 7,975,388 B2 | * | 7/2011 | Fuchs ...................... B27B 9/00 |
| | | | 30/377 |
| 7,980,924 B2 | | 7/2011 | Blatz |
| 8,037,610 B2 | | 10/2011 | Chambers |
| 8,056,244 B2 | | 11/2011 | Matsumoto |
| 8,201,335 B2 | | 6/2012 | Martin |
| 8,231,435 B2 | | 7/2012 | Nevin |
| 8,740,311 B2 | | 6/2014 | Nagasawa |
| 9,009,982 B1 | | 4/2015 | Sedgwick |
| 9,267,620 B2 | | 2/2016 | Sjodahl et al. |
| 9,610,704 B2 | | 4/2017 | Francis et al. |
| 9,937,638 B2 | | 4/2018 | Numata |
| 10,695,937 B2 | | 6/2020 | Yu et al. |
| 10,751,816 B2 | | 8/2020 | Rodriguez |
| 2004/0068877 A1 | * | 4/2004 | Saegesser ............... B25F 5/029 |
| | | | 30/392 |
| 2008/0244910 A1 | * | 10/2008 | Patel ...................... B23D 47/02 |
| | | | 30/123 |
| 2010/0000095 A1 | | 1/2010 | Matsumoto |
| 2010/0016257 A1 | | 1/2010 | Brown et al. |
| 2010/0043768 A1 | | 2/2010 | Yokota et al. |
| 2010/0058911 A1 | | 3/2010 | Goddard |
| 2012/0200140 A1 | | 8/2012 | Nagasawa |
| 2012/0318112 A1 | | 12/2012 | Muto |
| 2016/0368166 A1 | | 12/2016 | Numata et al. |
| 2017/0021466 A1 | * | 1/2017 | Hiroshima ................ B64F 5/60 |
| 2017/0232536 A1 | | 8/2017 | Rodriguez |
| 2018/0326515 A1 | | 11/2018 | Rodriguez |

FOREIGN PATENT DOCUMENTS

| | | |
|---|---|---|
| DE | 102016111028 A1 | 12/2016 |
| EP | 1625908 B1 | 4/2008 |
| EP | 1967310 A1 | 9/2008 |
| EP | 1923149 B1 | 9/2010 |
| EP | 2170545 B1 | 4/2011 |
| EP | 2517824 B1 | 11/2013 |
| EP | 2666592 A1 | 11/2013 |
| EP | 2915639 A1 | 9/2015 |
| EP | 2830826 B1 | 1/2017 |
| EP | 3113898 A1 | 1/2017 |
| EP | 2969429 B1 | 5/2018 |
| JP | S61-93206 A | 5/1986 |
| JP | 2009172696 A | 8/2009 |
| WO | 2011026302 A1 | 3/2011 |
| WO | 2018043330 A1 | 3/2018 |

OTHER PUBLICATIONS

Communication Pursuant to Article 94(3) EPC, dated Aug. 16, 2021, for corresponding application No. 18208929.2-1019.
Extended European Search Report dated Jan. 8, 2020

* cited by examiner

REPLACEMENT OF ROTATABLE CUTTING DISCS OF A POWER TOOL

CROSS-REFERENCE TO RELATED APPLICATIONS

The present application claims priority under 35 U.S.C. § 119 to European Patent Application No. 18208929.2 filed on Nov. 28, 2018, which is herein incorporated by reference in its entirety.

BACKGROUND OF THE INVENTION

Field of the Invention

This specification concerns facilitating a user to replace rotatable cutting discs of a power tool, for example a wall chaser.

Description of the Related Art

European patent number EP2552660B1 describes a wall chaser, which is a power tool for forming channels in a concrete surface. Objects such as cables and wires can be fed through such channels during a construction project. Wall chasers are known to carry a pair of axially offset cutting discs which in use form two parallel slots in a concrete surface. Subsequently a construction worker is required to chisel away the concrete remaining between such slots, thereby leaving a channel of the kind heretofore mentioned. It will be appreciated that the cutting discs are subject to wear and need replacing from time-to-time. Wall chaser products are known in which users must partially disassemble their wall chaser product, in other words physically separate respective parts thereof, to enable user access to the cutting discs for replacement or for other reasons e.g. to change the distance between cutting discs and thus cutting width. Furthermore, some wall chaser products require surprisingly high levels of dexterity to access the cutting discs thereof and can be difficult to open up in order to provide user access to the cutting discs for replacement or otherwise. Aspects of the present invention are conceived to address the foregoing.

SUMMARY OF THE INVENTION

According to an aspect of the present invention, there is provided a power tool comprising: a rotatable support arrangement for supporting at least one cutting disc and being configured to be rotatably driven by an electric motor; an upper shroud member and a lower shroud member which cooperate to define a volume in which the at least one cutting disc can be supported, the rotatable support arrangement coupled to the upper shroud member such that movement of the upper shroud member towards the lower shroud member causes the at least one cutting disc to protrude through an opening in the lower shroud member; biasing member for urging the upper shroud member and the lower shroud member away from each other; a limiting mechanism for limiting the range of movement of the upper shroud member relative to the lower shroud member under action of the biasing member, a first part thereof being carried by the upper shroud member and a second part thereof being carried by the lower shroud member; wherein the limiting mechanism can be disengaged by opening the upper shroud member via at least one hinge coupling, thereby increasing the range of relative movement of the upper and lower shroud members.

The upper shroud member may comprise a first shroud part and a second shroud part that are configured to move relative to each other via at least one the hinge coupling.

The first shroud part and the second shroud part may be configured to move relative to each other via a single hinge coupling.

The upper and lower shroud members may be configured to pivot relative to each other about a first axis and the or each the hinge coupling may permit relative movement between the first and second shroud parts about a respective axis orthogonal to the first axis.

The first shroud part and the second shroud part may be maintained in a closed configuration by a securing mechanism that can be selectively released by a user.

The limiting mechanism may be configured such that when the first and second parts thereof are urged against each other upon a user moving the upper and lower shroud members towards each other one of the first and second parts of the limiting mechanism causes the other to recoverably flex so that they can move past each other, however, upon the first and second parts of the limiting mechanism being subsequently brought back into contact with each other under action of the biasing member urging the upper and lower shroud members away from each other the first and second parts of the limiting mechanism restrict the extent to which the upper and lower shroud members can be moved away from each other under action of the biasing member.

The first and second parts of the limiting mechanism may comprise a spring that defines a first surface along which the other of the first and second parts of the limiting mechanism can ride for facilitating such parts to move past each other when urged against each other upon a user moving the upper and lower shroud members towards each other, the spring also defining a second surface against which the other of the first and second parts of the limiting mechanism can rest when such parts are subsequently brought back into contact with each other under action of the biasing member urging the upper and lower shroud members away from each other.

A blocking member of the shroud part carrying the spring may block deflection of the spring when the other of the first and second parts of the limiting mechanism urges against the second surface of the spring under action of the biasing member urging the upper and lower shroud members away from each other, thereby limiting the extent to which the upper and lower shroud members can move away from each other.

The blocking member may be an integral internal surface of the shroud part which carries the spring or is a feature coupled to that shroud part.

The spring may be metallic.

The other of the first and second parts of the limiting mechanism for cooperating with the spring may comprise a rigid body having a first surface for engaging the first surface of the spring and a second surface for engaging the second surface of the spring, optionally the second surface of the rigid body having a larger surface area than the first surface thereof.

The rigid body may further comprise a ramped portion between the first surface thereof and the second surface thereof.

The other of the first and second parts of the limiting mechanism for cooperating with the spring may comprise a rigid body having a rod like shape.

The rigid body may be an integral part of the shroud member that is free from carrying the spring.

The heretofore described tool may be a rotary cutting tool for cutting masonry, optionally wherein the tool is a wall chaser.

BRIEF DESCRIPTION OF THE DRAWINGS

Various aspects and embodiments of the invention will now be described by way of non-limiting example with reference to the accompanying drawings, in which.

DETAILED DESCRIPTION OF THE INVENTION

Figure 1:
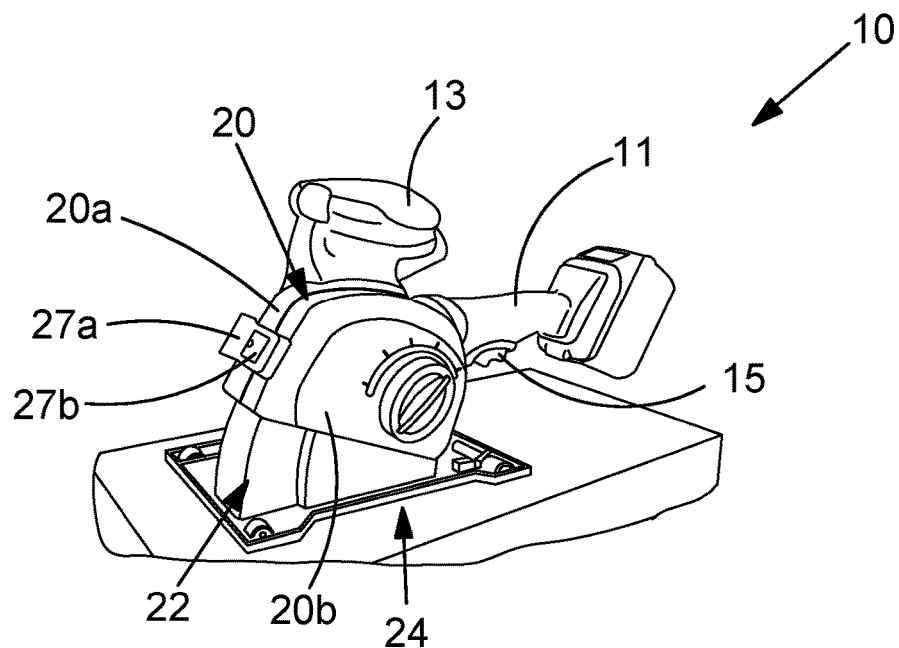
FIG. 1 illustrates a power tool according to an embodiment of the present invention in a ready-to-use configuration.
Figure 2:
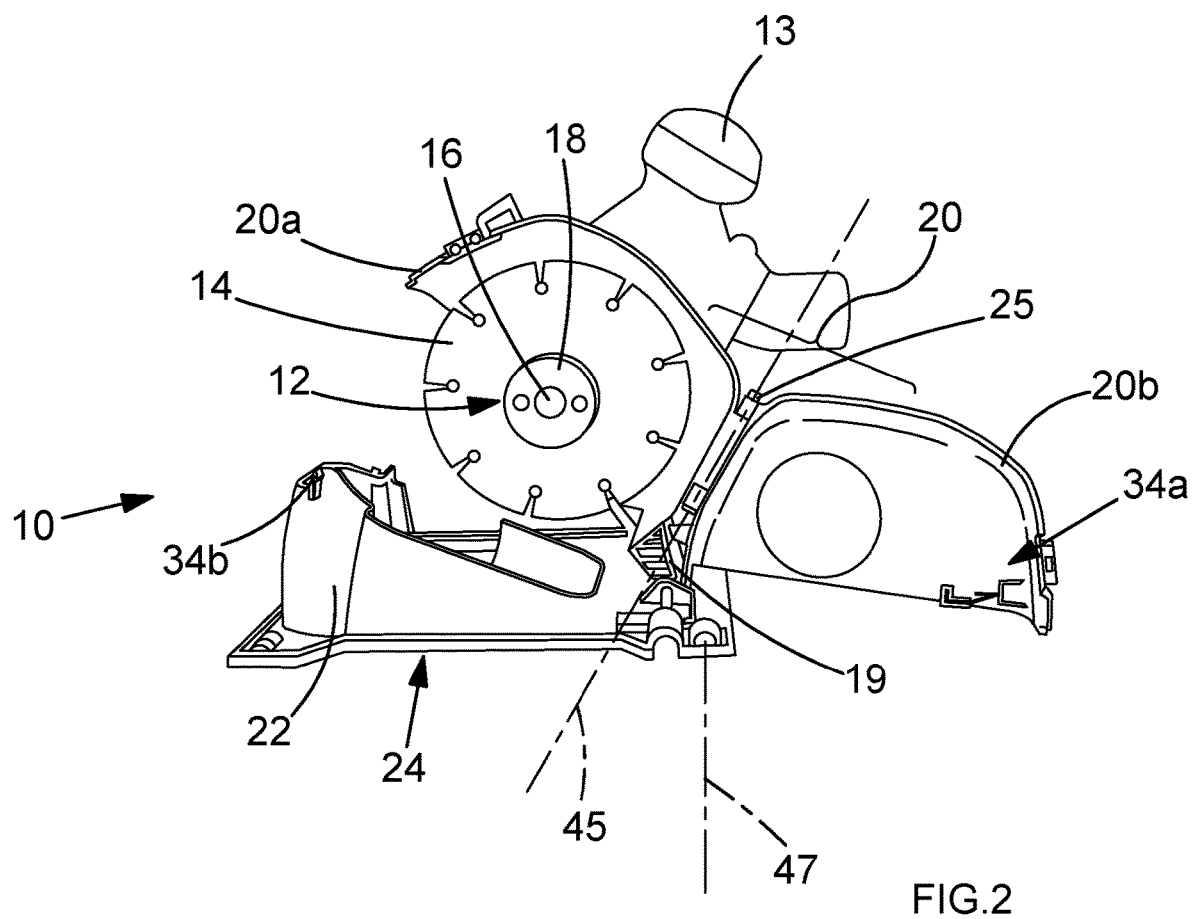
FIG. 2 illustrates the power tool of FIG. 1 in a cutting-disc-changing configuration.

FIGS. 1 and 2 illustrate a power tool, which in the embodiment described hereafter is a wall chaser 10. FIG. 1 illustrates the wall chaser 10 in a ready-to-use configuration and FIG. 2 illustrates the wall chaser 10 in a cutting-disc-changing configuration.

The wall chaser 10 has a rotatable support arrangement 12 for supporting a pair of cutting discs 14. The cutting discs 14 can be mounted to a shaft 16 of the support arrangement 12 in a manner familiar to persons skilled in the art. For example, the cutting discs 14 can be placed around the shaft 16 with a spacer element between them, wherein a nut 18 is then threaded onto the shaft 16. The action of threading the nut 18 onto the shaft 16 causes the first cutting disc to be mounted on the shaft 16 to be essentially sandwiched between a supporting flange of the wall chaser 10 and a first side of the spacer element, whereas the second cutting disc to be mounted on the shaft 16 will be essentially sandwiched between a second side of the spacer element and the nut 18. The cutting discs 14 are thus rotationally locked relative to the shaft 16 such that upon an electric motor 100 of the wall chaser 10 causing the shaft 16 to rotate the cutting discs 14 will be rotationally driven as well. It will be appreciated that various configurations and combinations of spacer elements can be used depending on the required distance between the cutting discs 14. For example, in another usage implementation the spacer element used could be shorter in length thereby providing a smaller distance between the cutting discs 14. Alternatively, the spacer element used could be longer in length (or more than one spacer element could be used) thereby providing a greater distance between the cutting discs 14.

An upper shroud member 20 and a lower shroud member 22 cooperate to define a volume in which the cutting discs 14 can be supported. The shaft 16 extends from an internal surface of the upper shroud member 20 such that movement of the upper shroud member 20 towards the lower shroud member 22 causes the cutting discs 14 to protrude through an opening 24 in the lower shroud member 22; this opening 24 extending through the base of the wall chaser 10 which is engaged with a work surface in use as shown in FIG. 1. In this manner the cutting discs 14 can be brought into engagement with a work surface e.g. a masonry surface in use.

Figure 3:
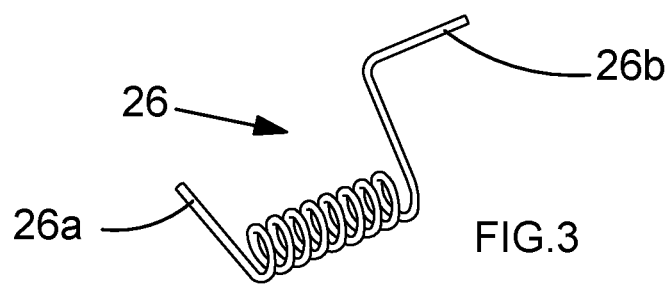
FIG. 3 illustrates a torsion spring of the power tool in FIG. 1.
Figure 4:
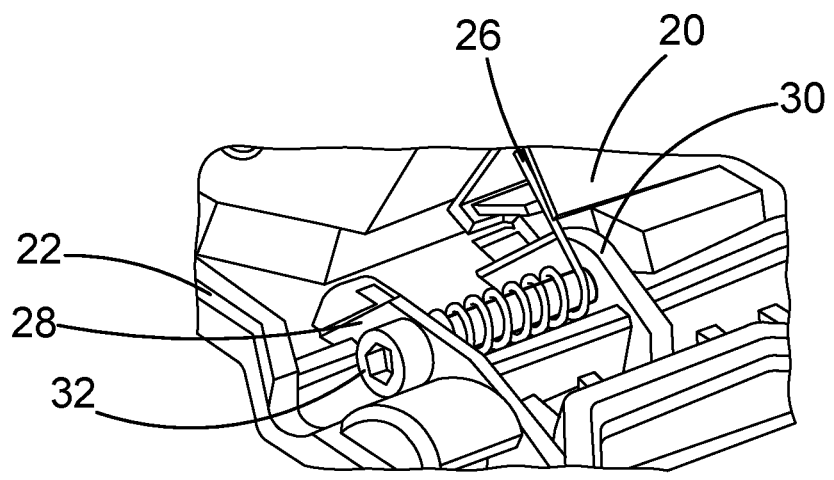
FIG. 4 illustrates the torsion spring of FIG. 3 included in the power tool of FIG. 1.

The upper shroud member 20 is pivotally coupled to the lower shroud member 22. Biasing member urges the upper shroud member 20 and the lower shroud member 22 away from each other. In this embodiment, the biasing member is a torsion spring 26, as shown in FIG. 3. With reference to FIG. 4 the lower shroud member 22 has a pair of flanges 28, 30 each having an opening extending therethrough. A bolt member 32 extends through these openings, wherein the torsion spring 26 wraps around the bolt member 32 in the space between the flanges 28, 30. A first arm 26a of the torsion spring 26 is for urging against the lower shroud member 22 and a second arm 26b of the torsion spring 26 is for urging against the upper shroud member 20. The upper shroud member 20 is pivotally coupled to the lower shroud member 22 so when a user pivots such members towards each other the torsion spring 26 is compressed, wherein upon releasing such members the torsion spring 26 urges them apart. Looking at FIG. 2 the feature of the upper shroud member 20 which the second arm 26b of the torsion spring 26 urges against is the connecting element 19.

Referring back to FIG. 1, one hand of a user grips the primary handle 11 in use, whereas the other hand grasps secondary handle 13. Pushing downwards on the secondary handle 13 in use causes the upper shroud member 20 to pivot towards the lower shroud member 22 and the cutting discs 14 to plunge into the masonry surface to be cut. Various internal features required for the wall chaser 10 to function as heretofore described will be apparent to persons skilled in the art, including a battery for powering an electric motor and a power train for transferring torque from the electric motor to the shaft 16 for rotating the cutting discs 14. Moreover, a trigger 15 is provided on the primary handle 11 for enabling a user to selectively cause actuation of the electric motor and thereby rotation of the cutting discs 14.

The upper shroud member 20 is formed of two parts, a first shroud part 20a and a second shroud part 20b which are coupled together via a hinge coupling 25. The upper shroud member 20 can thus be reconfigured between a closed configuration as in FIG. 1 and an open configuration as in FIG. 2. The first shroud part 20a and the second shroud part 20b are maintained in a closed configuration by a securing mechanism that can be selectively released by a user. In this embodiment the securing mechanism comprises a first latch part 27a on the first shroud part 20a that can be releasably coupled to a second latch part 27b on the second shroud part 20b, but other suitable mechanisms will be apparent to persons skilled in the art.

A limiting mechanism is provided for limiting the range of pivotal movement of the upper shroud member 20 relative to the lower shroud member 22 under action of the torsion spring 26 when the upper shroud part 20 is in the closed configuration. A first part 34a of the limiting mechanism is carried by the upper shroud member 20 and a second part 34b of the limiting mechanism is carried by the lower shroud member 22.

Figure 5:
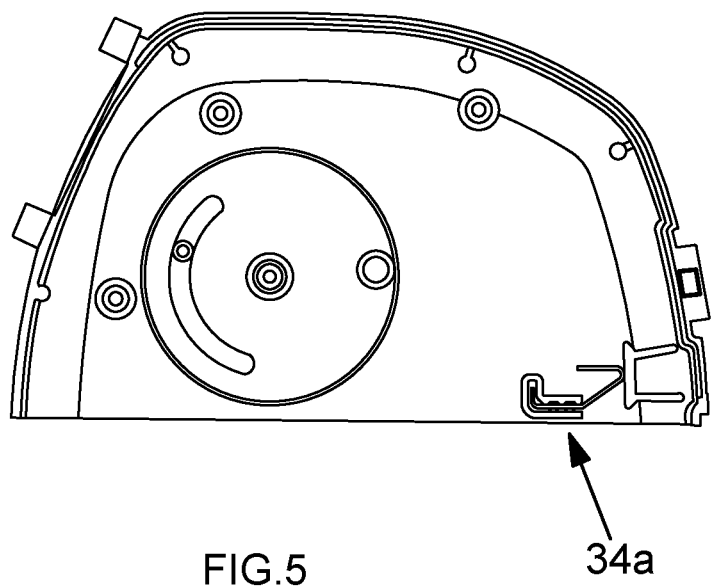
FIG. 5 illustrates a plan view of an internal surface of the second shroud part of the upper shroud member of the power tool in FIG. 1.
Figure 6:
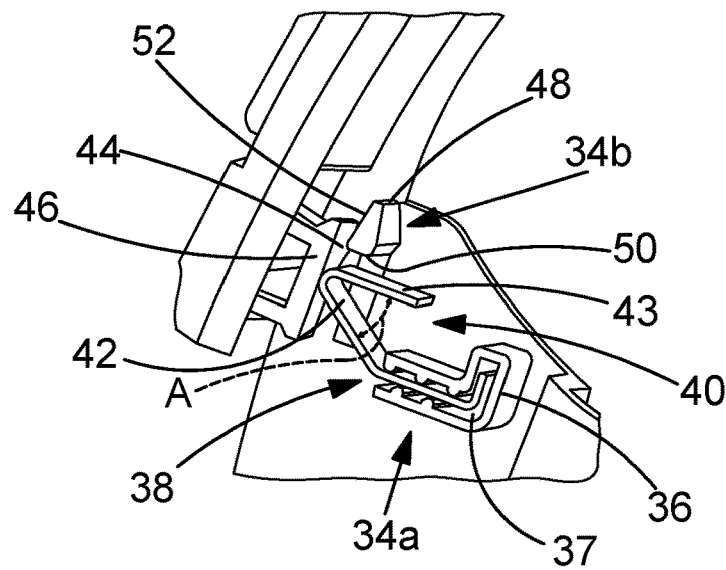
FIG. 6 illustrates how first and second parts of the limiting mechanism of the power tool in FIG. 1 cooperate in use.

With reference to FIGS. 5 and 6, the first part 34a of the limiting mechanism is provided on an internal surface of the upper shroud member 20, in the embodiment shown on the internal surface of the second shroud part 20b. The view in FIG. 6 includes a cross sectional view of the second shroud part 20b, otherwise the outer surface thereof would obscure the features extending from its internal surface. Protrusions 36 extending from the internal surface of the second shroud part 20b cooperate to define a substantially L-shaped channel 37, wherein an opening 38 is left in communication with the channel 37. A metallic spring feature or spring 40 is received in the channel 37 and maintained therein by interference fit with the internal surfaces of the protrusions 36. The metallic spring 40 extends from the channel 37 via the opening 38.

The metallic spring 40 has a first surface or section 42 that extends from the opening 38 of the channel 37 into contact with a blocking surface 44. In this embodiment the blocking surface 44 is defined by a blocking member 46 coupled to the internal surface of the upper shroud member 20, in the embodiment shown on the internal surface of the second shroud part 20b. The metallic spring 40 also has a second surface or section section 43 that extends away from the blocking surface 44. The first and second sections 42, 43 of the metallic spring 40 define an acute angle A between them. The purpose of these specific features will become apparent upon reading further.

With continued reference to FIGS. 5 and 6, the second part 34b of the limiting mechanism is carried by the lower shroud member 22 and can comprise a rigid body integrally formed with the lower shroud member 22. The rigid body forming the second part 34b has a first surface 48 and a second surface 50, wherein the second surface 50 has a larger surface area than the first surface 48. A ramped portion 52 is provided between such first and second surfaces 48, 50.

Looking at FIG. 2, consider the scenario in which a user closes the upper shroud member 20 and then urges the upper shroud member 20 towards the lower shroud member 22. This involves the user closing the first and second parts 20a, 20b of the upper shroud member 20 and securing the first latch part 27a to the second latch part 27b. Upon subsequently pivoting the upper shroud member 20 towards the lower shroud member 22, against bias of the torsion spring 26, the first section 42 of the metallic spring 40 carried by the upper shroud member 20 will be brought into engagement with the first surface 48 of the second part 34b carried by the lower shroud member 22. Upon further pivoting the upper shroud member 20 more towards the lower shroud member 22 the second part 34b cooperates with the metallic spring 40 to cause deflection of the metallic spring 40. In other words, the metallic spring 40 is caused to recoverably flex by the second part 34b thus enabling such features to move past each other. The upper shroud member 20 can thus be pivoted further towards the lower shroud member 22 by a user against bias of the torsion spring 26.

Looking at FIG. 6, the first section 42 of the metallic spring 40 is configured to be ramped relative to the first surface 48 of the second part 34b when they initially engage. This reduces the extent of deflection required by the metallic spring 40 to move past the second part 34b compared to if the first section 42 of the metallic spring 40 simply extended directly from the opening 38 along the axis of the channel 37.

With continued reference to FIG. 6, upon a user subsequently refraining from urging the upper shroud member 20 towards the lower shroud member 22 against bias of the torsion spring 26 the torsion spring 26 will urge such members apart. As the upper shroud member 20 pivots away from the lower shroud member 22 under bias of the torsion spring 26 the second section 43 of the metallic spring 40 carried by the upper shroud member 20 is brought into engagement with the second surface 50 of the second part 34b carried by the lower shroud member 22. The second surface 50 of the second part 34b thus cooperates with the metallic spring 40 to cause deflection of the metallic spring 40 in the opposite direction to that heretofore described, however, the extent of such deflection is limited by the blocking surface 44. In other words, the blocking surface 44 prevents the spring element 40 from deflecting sufficiently to enable it to move past the second part 34b as the upper shroud member 20 is pivoted away from the lower shroud member 22 under bias of the torsion spring 26. The extent of pivotal movement of the upper shroud member 20 relative to the lower shroud member 22 is thereby restricted. Moreover, the blocking surface acts as heretofore described to restrict the lower shroud member 22 from falling away from the upper shroud member 20 under gravity when a user lifts the tool up.

It is here mentioned that when the upper shroud member 20 is at its upper limit of pivotal movement away from the lower shroud member 22 (defined by engagement between the second section 43 of the metallic spring 40 and the second surface 50 of the second part 34b as heretofore described) the cutting discs 14 carried by the wall chaser 10 do not protrude through the opening 24 in the base thereof. The cutting discs 14 only protrude through the opening 24 in the base of the wall chaser 10 when a user urges the upper shroud member 20 towards the lower shroud member 22 against bias of the torsion spring 26 in use.

To enable replacement of the cutting discs 14 a user must release the first and second latch parts 27a, 27b to open the upper shroud member 20. On doing so the second shroud part 20b can be pivoted away from the first shroud part 20a about the hinge coupling 25, thereby the metallic spring 40 carried by the upper shroud member 20 is moved out of engagement with second part 34b carried by the lower shroud member 22. The heretofore described limiting mechanism is thus disengaged and the extent of pivotal movement between the upper shroud member 20 and lower shroud member 22 is increased. In the open configuration of the upper shroud member 20, when a user holds the wall chaser 10 from only the secondary handle 13 the lower shroud part 22 pivots away from the upper shroud part 20 under the influence of gravity and bias of the torsion spring 26.

With further reference to FIG. 2, when the upper shroud part 20 is in the open configuration, parts of the wall chaser 10 can pivot about two axes of freedom. The first such axis 45 is defined by the hinge coupling 25 and the second such axis 47 is defined by the pivotal connection between the upper and lower shroud members, wherein such axes are orthogonal relative to each other. Users of the wall chaser 10 are thus provided with quick and easy access to the cutting discs 14 mounted to the shaft 16 for facilitating their replacement or otherwise e.g. changing the distance between the cutting discs 14 by modifying the arrangement of spacer elements heretofore described which will be familiar to persons skilled in the art. Also, since features of the wall chaser 10 merely hinge apart to enable blade replacement the risk of a user losing a feature or not reassembling it correctly is reduced.

Lastly, it is pointed out that after a cutting disc replacement operation the wall chaser 10 can be reconfigured into its ready-to-use configuration illustrated in FIG. 1 in multiple ways. For example, starting from the configuration illustrated in FIG. 2 a user may secure the first and second shroud parts 20a, 20b of the upper shroud member 20 and then urge the upper shroud member 20 towards the lower shroud member 22 to engage the limiting mechanism as heretofore described.

Alternatively, starting from the configuration illustrated in FIG. 2 a user may urge the first shroud member 20 towards the lower shroud member 22 against the torsion spring 26 by pushing down on the secondary handle 13. Subsequently the user may then secure the first and second shroud parts 20a, 20b of the upper shroud member 20 together before releasing the pressure exerted against the torsion spring 26. On releasing such pressure, the upper shroud member 20 will be pivoted away from the lower shroud member 22 by the torsion spring 26, thereby engaging the second section 43 of the metallic spring 40 with the second surface 50 of the rigid member 34b for restricting further pivotal movement of the shroud members away from each other under bias of the torsion spring (and gravity when the tool is lifted).

In some embodiments, the blocking surface 44 is not defined by a blocking member 46 coupled to the internal surface of the upper shroud member 20, whereas instead it is merely an internal surface of the shroud part which carries the metallic spring 40 e.g. the inner surface of the shroud part or a flange integrally formed with the shroud part. In some embodiments the blocking surface 44 is a rib integrally formed with the upper shroud member 20 and extending from an inner surface thereof.

Although the first and second heretofore mentioned axes 45, 47 defining the degrees of freedom of movement of respective features of the wall chaser 10 have been described as being orthogonal relative to each other, in some embodiments this need not necessarily be the case provided the wall chaser 10 can be opened and closed in substantially the same manner for cutting disc replacement i.e. opening the upper shroud member 20 disengages the limiting mechanism.

Looking at FIG. 2, the connecting element 19 couples directly to the first shroud part 20a of the upper shroud member 20, thus providing that only the second shroud part 20b moves about the hinge connection 25. In some embodiments the connecting element 19 may be shaped such that both the first shroud part 20a and the second shroud part 20b are separately coupled thereto about respective hinge couplings. In other words, the first shroud part 20a may be coupled to the connecting element 19 via a first hinge coupling and the second shroud part 20b may be coupled to the connecting element 19 via a second hinge coupling; thereby providing that in such embodiments both the first and second shroud parts 20a, 20b can be hingedly moved relative to each other in order to open the upper shroud member 20.

Although the protrusions 36, metallic spring 40 and blocking surface 44 have been described as carried by the upper shroud member 20; and the second part 34b has been described as carried by the lower shroud member 22; it will be appreciated that such an arrangement could be reversed. For example, the protrusions 36, the metallic spring 40 and the blocking surface 44 could alternatively be carried by the lower shroud member 22; and the second part 34b could alternatively be carried by the upper shroud member 20 provided that the second part 34b is capable of being disengaged from the metallic spring 40 when the shroud parts of the upper shroud member 20 are opened relative to each other.

In some embodiments, the spring feature 40 need not necessarily be metallic and could be plastic or rubber for example, provided it is able to perform the same function as the metallic spring 40 heretofore described.

Although the foregoing embodiments are described as including a torsion spring 26 for urging the upper shroud member 20 away from the lower shroud member 22 in some embodiments an alternative biasing member could be used such as a cap spring, coil spring, clock spring or pressure spring.

Figure 7:
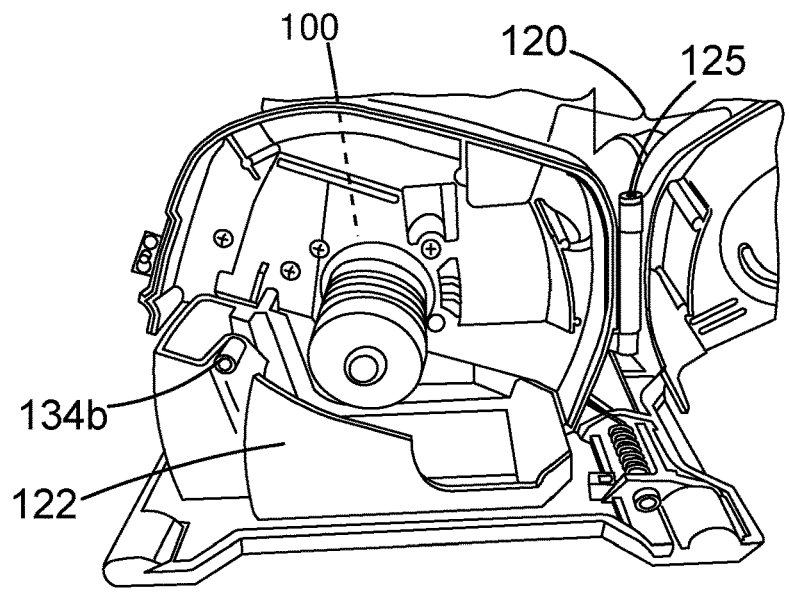
FIGS. 7 and 8 illustrate features of the limiting mechanism of a second embodiment.
Figure 8:
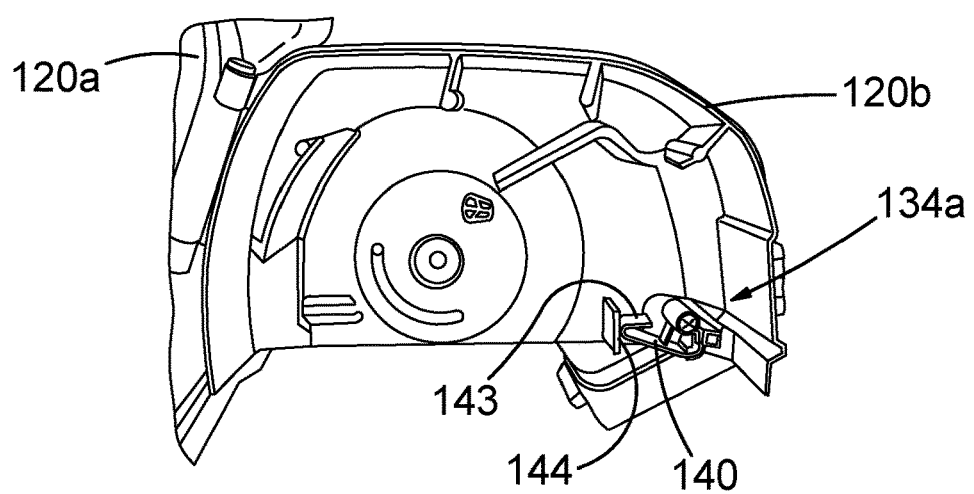

It will be appreciated that in other embodiments, respective features need not necessarily have the same shape and configuration of the parts heretofore described provided they achieve the same function. For example, with reference to FIGS. 7 and 8 (wherein like features are denoted with similar reference numerals to those used up to now but increased by 100) in one embodiment the second part 134b of the limiting mechanism carried by the lower shroud member 122 may be a rod or pin extending from the lower shroud 122. As for the first part 134a of the limiting mechanism carried by the upper shroud member the metallic spring feature or spring 140 cooperates with a blocking surface 144 formed by a rib extending from an internal surface of the second shroud part 120b. Upon closing the first and second shroud parts 120a, 120b and pushing the upper shroud member 120 towards the lower shroud member 122 against spring bias as heretofore described, the rod or pin will cooperate with the metallic spring portion 140 causing it to deflect and move past the rod or pin and spring back to its original configuration. Upon a user refraining from pushing the upper shroud member 120 towards the lower shroud member 122 the spring bias will cause the section 143 of the metallic spring 140 to engage the rod or pin which will urge it into contact with the blocking surface 144, thereby restricting the spring bias from being able to urge the upper and lower shroud members 120, 122 apart. Moreover, the blocking surface 144 acts as to restrict the lower shroud member 122 from falling away from the upper shroud member 120 under gravity when a user lifts the tool up. The mechanism can be released by opening the upper shroud member 120 via the hinge coupling 125.

Although the foregoing is described in the specific context of a wall chaser 10 it will be appreciated that the teachings herein could be applied in the context of other power tools having rotatable cutting discs that are shielded from user access in use but that a user must have access to in order to replace them, e.g. circular saw power tools. It will thus further be appreciated that in some embodiments the power tool in which the foregoing teachings are applied could have only a single cutting disc.

Finally, it will be appreciated that whilst various aspects and embodiments have heretofore been described, the scope of the present invention is not limited thereto and instead extends to encompass all arrangements, and modifications and alterations thereto, which fall within the spirit and scope of the appended claims.

What is claimed is:

1. A power tool comprising:
   a rotatable support arrangement for supporting at least one cutting disc and being configured to be rotatably driven by an electric motor;
   an upper shroud member and a lower shroud member which cooperate to define a volume in which the at least one cutting disc can be supported, the rotatable support arrangement coupled to the upper shroud member such that movement of the upper shroud member towards the lower shroud member causes the at least one cutting disc to protrude through an opening in the lower shroud member;

a biasing member for urging the upper shroud member and the lower shroud member away from each other; and a limiting mechanism for limiting a range of movement of the upper shroud member relative to the lower shroud member under action of the biasing member, a first part of the limiting mechanism being carried by the upper shroud member and a second part of the limiting mechanism being carried by the lower shroud member, wherein the upper shroud member comprises a first shroud part and a second shroud part that are configured to close the upper shroud member and configured to move relative to each other via at least one hinge coupling; and wherein the limiting mechanism can be disengaged by opening the upper shroud member via said at least one hinge coupling, thereby increasing the range of relative movement of the upper and lower shroud members.

2. The power tool of claim 1, wherein the upper and lower shroud members are configured to pivot relative to each other about a first axis, and said at least one hinge coupling permits relative movement between the first and second shroud parts about a second axis orthogonal to the first axis.

3. The power tool of claim 1, wherein the first shroud part and the second shroud part are maintained in a closed configuration by a securing mechanism that can be selectively released by a user.

4. The power tool of claim 1, wherein the limiting mechanism is configured such that when the first and second parts of the limiting mechanism are urged against each other upon a user moving the upper and lower shroud members towards each other, wherein one of the first and second parts of the limiting mechanism causes the other to recoverably flex so that they can move past each other, and wherein upon the first and second parts of the limiting mechanism being subsequently brought back into contact with each other under action of the biasing member urging the upper and lower shroud members away from each other, the first and second parts of the limiting mechanism restrict an extent to which the upper and lower shroud members can be moved away from each other under action of the biasing member.

5. The power tool of claim 1, wherein the power tool is a rotary cutting tool for cutting masonry.

6. The power tool of claim 1, wherein the power tool is a wall chaser.

7. A power tool comprising:

a rotatable support arrangement for supporting at least one cutting disc and being configured to be rotatably driven by an electric motor;

an upper shroud member and a lower shroud member which cooperate to define a volume in which the at least one cutting disc can be supported, the rotatable support arrangement coupled to the upper shroud member such that movement of the upper shroud member towards the lower shroud member causes the at least one cutting disc to protrude through an opening in the lower shroud member;

a biasing member for urging the upper shroud member and the lower shroud member away from each other; and a limiting mechanism for limiting a range of movement of the upper shroud member relative to the lower shroud member under action of the biasing member, a first part of the limiting mechanism being carried by the upper shroud member and a second part of the limiting mechanism being carried by the lower shroud member, wherein the limiting mechanism can be disengaged by opening the upper shroud member via at least one hinge coupling, thereby increasing the range of relative movement of the upper and lower shroud members, wherein the limiting mechanism is configured such that when the first and second parts of the limiting mechanism are urged against each other upon a user moving the upper and lower shroud members towards each other, wherein one of the first and second parts of the limiting mechanism causes the other to recoverably flex so that they can move past each other, wherein upon the first and second parts of the limiting mechanism being subsequently brought back into contact with each other under action of the biasing member urging the upper and lower shroud members away from each other, the first and second parts of the limiting mechanism restrict an extent to which the upper and lower shroud members can be moved away from each other under action of the biasing member, wherein one of the first and second parts of the limiting mechanism comprises a spring that defines a first surface along which the other of the first and second parts of the limiting mechanism can ride for facilitating such the first and second parts to move past each other when urged against each other upon a user moving the upper and lower shroud members towards each other, and wherein the spring also defines a second surface against which the other of the first and second parts of the limiting mechanism rest when the first and second parts are subsequently brought back into contact with each other under action of the biasing member urging the upper and lower shroud members away from each other.

8. The power tool of claim 7, wherein a blocking member of one of the upper and lower shroud members carrying the spring, blocks deflection of the spring when the other of the first and second parts of the limiting mechanism urges against the second surface of the spring under action of the biasing member urging the upper and lower shroud members away from each other, and wherein the blocking member limits the extent to which the upper and lower shroud members can move away from each other.

9. The power tool of claim 8, wherein the blocking member is an integral internal surface of one of the upper and lower shroud members which carries the spring.

10. The power tool of claim 8, wherein the blocking member is coupled to one of the upper and lower shroud members that carries the spring.

11. The power tool of claim 7, wherein the spring is metallic.

12. The power tool of claim 7, wherein the other one of the first and second parts of the limiting mechanism that cooperates with the spring comprises a rigid body having a first surface for engaging the first surface of the spring, and a second surface for engaging the second surface of the spring.

13. The power tool of claim 12, wherein the second surface of the rigid body has a larger surface area than the first surface of the rigid body.

14. The power tool of claim 12, wherein the rigid body further comprises a ramped portion between the first surface and the second surface.

15. The power tool of claim 12, wherein the rigid body is an integral part of one of the upper and lower shroud members that is free from carrying the spring.

16. The power tool of claim 7, wherein one of the first and second parts of the limiting mechanism that cooperates with the spring comprises a rigid body having a rod shape.

* * * * *